US009307212B2

(12) United States Patent
Vranceanu

(10) Patent No.: US 9,307,212 B2
(45) Date of Patent: Apr. 5, 2016

(54) TONE MAPPING FOR LOW-LIGHT VIDEO FRAME ENHANCEMENT

(71) Applicant: FotoNation Limited, Galway (IE)

(72) Inventor: Ruxandra Vranceanu, Bucharest (RO)

(73) Assignee: Fotonation Limited, Ballybrit, Galway (IE)

(*) Notice: Subject to any disclaimer, the term of this patent is extended or adjusted under 35 U.S.C. 154(b) by 0 days.

(21) Appl. No.: 14/810,297

(22) Filed: Jul. 27, 2015

(65) Prior Publication Data

US 2015/0334283 A1    Nov. 19, 2015

Related U.S. Application Data

(60) Continuation of application No. 14/535,036, filed on Nov. 6, 2014, now Pat. No. 9,094,648, which is a continuation of application No. 14/012,806, filed on Aug. 28, 2013, now Pat. No. 8,890,983, and a division of application No. 12/941,983, filed on Nov. 8, 2010, now Pat. No. 8,698,924, and a continuation-in-part of application No. 12/485,316, filed on Jun. 16, 2009, now Pat. No. 8,199,222.

(51) Int. Cl.
*H04N 5/235* (2006.01)
*H04N 9/64* (2006.01)
*G06T 5/00* (2006.01)
(Continued)

(52) U.S. Cl.
CPC ............... *H04N 9/646* (2013.01); *G06T 5/003* (2013.01); *G06T 5/009* (2013.01); *G06T 5/40* (2013.01); *G06T 5/50* (2013.01); *H04N 5/235* (2013.01); *H04N 5/2355* (2013.01); *H04N 9/045* (2013.01); *H04N 9/68* (2013.01); *G06T 2207/10016* (2013.01); *G06T 2207/10024* (2013.01);
(Continued)

(58) Field of Classification Search
CPC .......... H04N 5/23229; H04N 5/23235; H04N 5/2355; H04N 5/2356; H04N 5/357; H04N 5/3655; H04N 9/646; H04N 9/71; H04N 1/60; H04N 5/2176; H04N 1/409; H04N 9/093; H04N 1/4072; H04N 5/243; H04N 9/68; G06T 5/003
See application file for complete search history.

(56) References Cited

U.S. PATENT DOCUMENTS 6,741,960 B2    5/2004  Kim et al.
7,072,525 B1    7/2006  Covell
(Continued)

FOREIGN PATENT DOCUMENTS

JP     2005-352721 A      12/2005
WO     WO 01/13171 A1      2/2001
WO     WO 2010/145910 A1  12/2010

OTHER PUBLICATIONS

U.S. Appl. No. 12/941,983, filed Nov. 8, 2010, Notice of Allowance, Dec. 5, 2013.
(Continued)

*Primary Examiner* — Aung S Moe
(74) *Attorney, Agent, or Firm* — Hickman Palermo Becker Bingham LLP

(57) ABSTRACT

A technique is provided for generating sharp, well-exposed, color images front low-light images. A series of under-exposed images is acquired. A mean image is computed and a sum image is generated each based on the series of under-exposed images. Chrominance variables of pixels of the mean image are mapped to chrominance variables of pixels of the sum image. Chrominance values of pixels within the series of under-exposed images are replaced with chrominance values of the sum image. A set of sharp, well-exposed, color images is generated based on the series of under-exposed images with replaced chrominance values.

25 Claims, 7 Drawing Sheets

(51) Int. Cl.
   *G06T 5/40* (2006.01)
   *G06T 5/50* (2006.01)
   *H04N 9/04* (2006.01)
   *H04N 9/68* (2006.01)

(52) U.S. Cl.
   CPC .............. *G06T2207/10144* (2013.01); *G06T 2207/20008* (2013.01)

(56) References Cited

U.S. PATENT DOCUMENTS

| | | | |
|---|---|---|---|
| 7,162,101 | B2 | 1/2007 | Itokawa et al. |
| 7,657,172 | B2 | 2/2010 | Nomura et al. |
| 7,773,115 | B2 * | 8/2010 | Estevez ............ H04N 5/23248 348/208.13 |
| 8,169,486 | B2 | 5/2012 | Corcoran et al. |
| 8,184,182 | B2 * | 5/2012 | Lee ..................... G06T 5/50 348/208.4 |
| 8,199,222 | B2 * | 6/2012 | Drimbarean ........... G06T 5/009 348/239 |
| 8,264,576 | B2 | 9/2012 | Susanu et al. |
| 8,417,055 | B2 | 4/2013 | Albu et al. |
| 8,494,300 | B2 * | 7/2013 | Steinberg ............... G06T 7/20 348/208.99 |
| 8,698,924 | B2 | 4/2014 | Drimbarean et al. |
| 8,737,766 | B2 | 5/2014 | Albu et al. |
| 2003/0128893 | A1 | 7/2003 | Castorina et al. |
| 2004/0061796 | A1 | 4/2004 | Honda et al. |
| 2004/0066981 | A1 | 4/2004 | Li et al. |
| 2004/0130628 | A1 | 7/2004 | Stavely |
| 2004/0145659 | A1 | 7/2004 | Someya et al. |
| 2005/0248660 | A1 | 11/2005 | Stavely |
| 2006/0017837 | A1 | 1/2006 | Sorek et al. |
| 2006/0098237 | A1 | 5/2006 | Steinberg et al. |
| 2006/0098890 | A1 | 5/2006 | Steinberg et al. |
| 2006/0098891 | A1 | 5/2006 | Steinberg et al. |
| 2006/0119710 | A1 | 6/2006 | Ben-Ezra et al. |
| 2006/0125938 | A1 | 6/2006 | Ben-Ezra et al. |
| 2006/0133688 | A1 | 6/2006 | Kang et al. |
| 2006/0187308 | A1 * | 8/2006 | Lim ..................... G06T 5/50 348/208.4 |
| 2006/0227249 | A1 | 10/2006 | Chen et al. |
| 2007/0058073 | A1 | 3/2007 | Steinberg et al. |
| 2007/0083114 | A1 | 4/2007 | Yang et al. |
| 2007/0097221 | A1 | 5/2007 | Stavely et al. |
| 2007/0268388 | A1 | 11/2007 | Watanabe et al. |
| 2008/0088858 | A1 | 4/2008 | Marcu et al. |
| 2008/0166115 | A1 | 7/2008 | Sachs et al. |
| 2008/0218611 | A1 | 9/2008 | Parulski et al. |
| 2008/0219581 | A1 * | 9/2008 | Albu ..................... G06T 3/4053 382/261 |
| 2008/0231728 | A1 * | 9/2008 | Asoma ................. G03B 7/093 348/229.1 |
| 2008/0259175 | A1 | 10/2008 | Muramatsu et al. |
| 2008/0267530 | A1 | 10/2008 | Lim |
| 2009/0009612 | A1 | 1/2009 | Tico et al. |
| 2009/0167893 | A1 * | 7/2009 | Susanu ................. G06T 5/009 348/224.1 |
| 2009/0179995 | A1 * | 7/2009 | Fukumoto .......... H04N 5/23248 348/208.6 |
| 2009/0179999 | A1 * | 7/2009 | Albu ..................... G06T 3/4053 348/222.1 |
| 2009/0185041 | A1 | 7/2009 | Kang et al. |
| 2009/0284610 | A1 | 11/2009 | Fukumoto et al. |
| 2010/0026823 | A1 | 2/2010 | Sawada |
| 2010/0329582 | A1 * | 12/2010 | Albu ....................... G06T 5/003 382/255 |
| 2012/0069222 | A1 * | 3/2012 | Steinberg ............... G06K 9/036 348/239 |
| 2013/0236094 | A1 | 9/2013 | Albu et al. |
| 2013/0342738 | A1 * | 12/2013 | Vranceanu ............ G06T 5/009 348/242 |
| 2015/0062387 | A1 | 3/2015 | Vranceanu |
| 2015/0092089 | A1 * | 4/2015 | Vitsnudel ............... G06T 5/002 348/242 |

OTHER PUBLICATIONS

U.S. Appl. No. 14/012,806, filed Aug. 28, 2013, Notice of Allowance, Jul. 15, 2014.

U.S. Appl. No. 14/535,036, filed Nov. 6, 2014, Notice of Allowance, Apr. 27, 2015.

PCT Notification of Transmittal of the International Search Report and the Written Opinion of the International Arching Authority, or the Declaration, for PCT Application No. PCT/EP2010/056999, report dated Sep. 1, 2010, 10 Pages.

PCT Notification Concerning Transmittal of International Preliminary Report on Patentability (Chapter I of the Patent Cooperation Treaty) (PCT Rule 44bis.1(c)), for PCT Application No. PCT/EP2010/056999, report dated Dec. 29, 2011, 8 Pages.

Deever A: "In-camera all-digital video stabilization", Proceedings of the inter. con. on decisionsupport systems, Proceedigns of ISDSS, 1, Jan. 2006, pp. 190-193.

Demir B et al: "Block motion estimation using adaptive modified two-bit transform" Jun. 5, 2007, vol. 1, No. 2, Jun. 5, 2007, pp. 215-222.

Xinqiao Liu and Abbas El Gamal, Photocurrent Estimation from Multiple Non-destructive Samples in a CMOS Image Sensor, In Proceedings of the SPIE Electronic Imaging '2001 conference, vol. 4306, San Jose, CA, Jan. 2001. pp. 450-458.

John C. Russ: Chapter 3: Correcting Imaging Defects. In the Image Processing Handbook, 2002, by CRC Press, LLC. 75 Pages.

Moshe Ben-Ezra, Shree K. Nayar, Motion Deblurring Using Hybrid Imaging, CVPR, vol. 1, 2003 IEEE Computer Society Conference on Computer Vision and Pattern Recognition (CVPR '03)—vol. 1, 2003, 8 Pages.

Mejdi Trimeche, Dmitry Paliyb, Markku Vehvilainena, Vladimir Katkovnikb, Multichannel image deblurring of raw color components, Computational Imaging III. Edited by Bouman, Charles A.; Miller, Eric L. Proceedings of the SPIE, vol. 5674, pp. 169-178 (2005).

Jannson, Peter A: "Deconvolution of Images and Spectra" 2nd. Edition, Academic Press, 1997.

Patent Abstracts of Japan, publication No. 2005-352721, publication date: Dec. 22, 2005, for: Imaging Device.

* cited by examiner

Multiple SET frames combined firstly with an FET frame;
then with sequential output video frames to obtain a plurality
of output video frames from a single originaly FET frame.

Mean Image of the Sequence

Initial, under-exposed image

Correctly exposed image

Final, enhanced image

TONE MAPPING FOR LOW-LIGHT VIDEO FRAME ENHANCEMENT

This application claims the benefit under 35 U.S.C. §120 as a continuation of application Ser. No. 14/0535,036, filed Nov. 6, 2014, which claims benefits under 35 U.S.C. §120 as a continuation of application 14/012,806, filed Aug. 28, 2013, issued as U.S. Pat. No. 8,890,983 on Nov. 18, 2014, which claims benefits under 35 U.S.C. §121 as a divisional application of 12/941,983, filed Nov. 8, 2010, issued as U.S. Pat. No. 8,698,924, 82 on Apr. 15, 2014, which claims benefits as a continuation-in-part of application Ser. No. 12/485,316, filed Jun. 16, 2009, issued as U.S. Pat. No. 8,199,222 on Jun. 12, 2012, the entire contents of which are hereby incorporated by reference for all purposes as if fully set forth herein. The applicant hereby rescinds any disclaimer of claim scope in the parent applications or the prosecution history thereof and advise the USPTO that the claims in this application may be broader than any claim in the parent applications.

BACKGROUND OF THE INVENTION

1. Field of the Invention

The present invention relates to an image processing method and apparatus, and specifically to low-light video frame enhancement.

2. Description of the Related Art

Sensor arrays for digital cameras exist for capturing color photos. Sensors known as RGBW sensors are used for capturing red, green, and blue colors, and for capturing luminance information for multiple pixels of an array of pixels. The red, green and blue pixels include filters such that only certain narrow ranges of wavelengths of incident light are counted. The white pixels capture light of red, green and blue wavelengths, i.e., of a broader range of wavelengths than any of the blue, green and red pixels. Thus, the white pixels are typically brighter than any of the blue, red and green pixels if they are exposed for the same duration. Noise removal algorithms can tend to blur face regions in an undesirable manner. Noise removal algorithms are described at U.S. patent application Ser. Nos. 11/856,721 and 11/861,257, which are hereby incorporated by reference, as are U.S. application Ser. Nos. 10/985,650, 11/573,713, 11/421,027, 11/673,560, 11/319,766, 11/744,020, 11/753,098, 11/752,925, and 12/137,113, which are assigned to the same assignee as the present application and are hereby incorporated by reference.

Kodak has developed a RGBW color filter pattern differing from the previously known Bayer Color Filter. The RGBW pattern of Kodak is referred to as a Color Filter Array (CFA) 2.0. One half of cells in the RGBW pattern are panchromatic, i.e. sensing all of the color spectrum (Y component)—usually called white cells. This way more light energy is accumulated in the same amount of time than for color pixels. A Bayer filter uses only ⅓ (~0.33) of color spectrum energy. An RGBW filer uses ⅔ (~0.67) of the energy, where ½ comes from white cells and ⅙ from RGB cells.

CFA Array looks something like the following:
WBWG . . .
BWGW . . .
WGWR . . .
RWRW . . .

In this context, the following are incorporated by reference: U.S. Pat. Nos. 7,195,848, 7,180,238, 7,160,573, 7,019,331, 6,863,368, 6,607,873, 6,602,656, 6,599,668, 6,555,278, 6,387,577, 6,365,304, 6,330,029, 6,326,108, 6,297,071, 6,114,075, 5,981,112, 5,889,554, 5,889,277, 5,756,240, 5,756,239, 5,747,199, 5,686,383, 5,599,766, 5,510,215, 5,374,956, and 5,251,019.

Two source images nominally of the same scene may be used to produce a single target image of better quality or higher resolution than either of the source images.

In super-resolution, multiple differently exposed lower resolution images can be combined to produce a single high resolution image of scene, for example, as disclosed in "High-Resolution Image Reconstruction from Multiple Differently Exposed Images", Gunturk et al., IEEE Signal Processing Letters, Vol. 13, No. 4, April 2006; or "Optimizing and Learning for Super-resolution", Lyndsey Pickup et al, BMVC 2006, 4-7 Sep. 2006, Edinburgh, UK, which are hereby incorporated by reference. However, in super-resolution, blurring of the individual source images either because of camera or subject motion are usually not of concern before the combination of the source images.

U.S. Pat. No. 7,072,525, incorporated by reference, discloses adaptive filtering of a target version of an image that has been produced by processing an original version of the image to mitigate the effects of processing including adaptive gain noise, up-sampling artifacts or compression artifacts.

U.S. published applications 2006/0098890, 2007/0058073, 2006/0098237, 2006/0098891, European patent EP1779322B1, and PCT Application No. PCT/EP2005/011011 (WO2006/050782), which are each hereby incorporated by reference, describe uses of information from one or more presumed-sharp, short exposure time (SET) preview images to calculate a motion function for a fully exposed higher resolution main image to assist in the de-blurring of the main image.

Indeed many other documents, including US 2006/0187308, Suk Hwan Lim et al.; and "Image Deblurring with Blurred/Noisy Image Pairs", Lu Yuan et al, SIGGRAPH07, Aug. 5-9, 2007, San Diego, Calif., which are incorporated by reference, are directed towards attempting to calculate a blur function in the main image using a second reference image before de-blurring the main image.

Other approaches, such as may be disclosed in US2006/0017837, which is incorporated by reference, involve selecting information from two or more images, having varying exposure times, to reconstruct a target image where image information is selected from zones with high images details in SET images and from zones with low image details in longer exposure time images.

Nowadays, even though image processing techniques have evolved, still low-light scenes tend to lead to very dark frames in videos. By these means the visual quality is low. For example, movies taken in low-light conditions (e.g. 30 lux illumination), at 30 fps, generally result in very dark, under-exposed frames that have a very low contrast, so objects are not distinguishable. Tone mapping (amplification) algorithms may be applied to improve such images. Although these may provide better exposed image, there are difficulties in restoring the natural colors of the scene. For example, simple summation or forcing higher exposure tends to lead to frames degraded by motion blur.

United States published patent application no. 2009/0303343, which belongs to the same assignee and is incorporated by reference, describes background techniques generally involving two different images acquired either at different moments of time or by two different sensors. It is desired to have a new technique that utilizes images having identical or substantially similar content, and such is provided herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTIONS OF THE EMBODIMENTS

Figure 1:
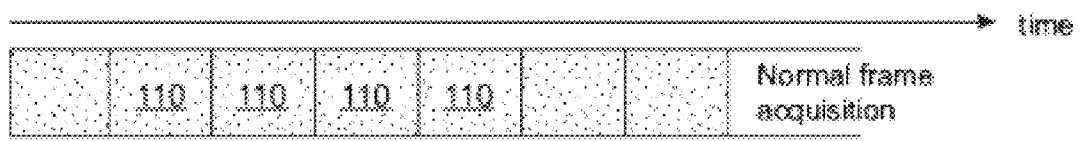
FIG. 1 schematically illustrates conventional video frame acquisition.

A method of generating sharp, well-exposed, color images from low-light images is provided. A series of under-exposed images is acquired. A mean image (Hmean) is computed based on the series of under-exposed images. A sum image (Gsum) is generated also based on the series of under-exposed images. Chrominance variables of pixels of the mean image are mapped to chrominance variables of pixels of the sum image. Chrominance values of pixels within the series of under-exposed images are replaced with chrominance values of the sum image. A set of sharp, well-exposed, color images is generated based on the series of under-exposed images with replaced chrominance values.

The acquiring of the series of under-exposed images may include capturing raw images and generating processed RGB images based on the raw images.

The computing of the mean image may include applying a tone mapping transformation to the series of under-exposed images. The tone-mapping transformation may include a logarithmic transformation.

The mean and/or sum images may be transformed to YUV space prior to mapping and replacing the chrominance values. The under-exposed images may be transformed with replaced chrominance values back to RGB space.

The set of sharp, well-exposed, color images may include multiple video images and/or one or more still images.

An image processing method in accordance with certain further embodiments is also provided. A first underexposed and sharp image of a scene is obtained. A second image relatively well exposed and blurred compared to said first image, nominally of the same scene, is also obtained. The first and second images may be derived from respective image sources, or from a same source, and/or may be based on or derived from same or different sets of images taken from a same sequence of acquired RAW images. The second image is acquired at a different resolution and a different exposure time than the first image. The method involves scanning across the first and second images. A portion of the first image is provided as an input signal to an adaptive filter. A corresponding portion of the second image is provided as a desired signal to the adaptive filter. Filter coefficients are calculated for the portion of the images at a given scanning location based on a combination of the input signal, the desired signal and existing filter coefficients for the scanning location. The method further includes adaptively filtering the input signal based on the filter coefficients to produce an output signal and constructing a first filtered image from the output signal, less blurred than the second image.

The first and second images may be in RGB format. The image portions may include a reactive color plane of the first and second images. The method may include constructing each color plane of the first filtered image from a combination of the filter coefficients and the input signal color plane information.

The first and second images may be in YCC format. The image portions may include a respective Y plane of the first and second images. The constructing of the first filtered image may include using the output signal as a Y plane of the first filtered image and using Cb and Cr planes of the input image as the Cb and Cr planes of the first filtered image.

The method may further include providing a portion of said first filtered image as the input signal to an adaptive filter; providing a corresponding portion of the second image as a desired signal to the adaptive filter; further adaptively filtering the input signal to produce a further output signal; and constructing a further filtered image from the further output signal less blurred than the first filtered image.

The first and second images may be in RGB formal and, for producing the first filtered image, the image portions may include a respective color plane of the first and second images. The providing a portion of the first filtered image may involve converting the first filtered image to YCC format. The method may include converting the second image to YCC format. The image portions for further adaptive filtering may include a respective Y plane of the converted images.

The first and second images may be in YCC format and, for producing the first filtered image, the image portions may include a respective Y plane of the first and second images. The providing a portion of the first filtered image may involve converting the first filtered image to RGB format. The method may include converting the second image to RGB format. The image portions for further adaptive filtering may include a respective color plane of the converted images.

The image source for the second image may be of a relatively higher resolution than the image source for the first image. The method may include, prior to adaptive filtering, estimating a point spread function, PSF, for the second image. Responsive to the PSF being less than a predetermined threshold, the method may also include de-blurring the second image using the point spread function.

The image source for the second image may be of a relatively lower resolution than the image source for the first image. The method may include aligning and interpolating the second source to match the alignment and resolution of the first source. Responsive to the first and second sources being misaligned by more than a predetermined threshold, the method may include providing the desired signal from a linear combination of the first and second image sources, or providing the desired signal from a combination of phase values from one of the first and second image sources and amplitude values for the other of the first and second image sources.

The adaptive filtering may be performed row-wise or column-wise on the input signal. Further adaptive filtering may be performed the other of row-wise or column wise on the input signal.

The method may include amplifying the luminance characteristics of the under exposed image prior to the adaptive filtering.

The first image may be one of an image acquired soon before or after the second image.

A digital video acquisition system is also provided, including a lens, an image sensor for capturing a stream of multiple digital, video or still, images, a processor and a memory having processor-readable code embedded therein for programming the processor to perform any of the methods described above or below herein.

One or more processor-readable media is/are also provided which have processor-readable code embedded therein for programming one or more processors to perform may of the methods described above or below herein.

Several embodiments are described herein that use a pair of images to enhance one of them. Alternative embodiments may be obtained by combining features of two or more of these embodiments, or by combining features of one or more of the embodiments with features described in the background or in any of the references cited there or hereinbelow. In certain embodiments, one of the pair of images is the target image (which is sharp but under exposed and noisy), and another image is the reference image (which is well-exposed but blurred, e.g., motion blurred). In specific embodiments, the use of the method is dedicated to improving the quality of video-frames, or sequences of still images, acquired in scenes with low light. For ensuring animation (motion, fluency), the frame-rate in a video is generally over a predetermined threshold (e.g., 12 frames/sec). This imposes a maximum exposure time for each frame. In low light conditions, this exposure time is not-sufficient for offering good visual quality. Several embodiments are provided herein as solutions to overcome this problem. Several methods of improving video capture in low-light are provided by applying techniques to a continuous sequence of images. Three embodiments generally incorporate modified image processing within a conventional video camera or any later generation camera, while a fourth embodiment involves a video camera that incorporates two distinct image acquisition subsystems.

Image+Video

FIG. 1 schematically illustrates a conventional frame acquisition process. According to the illustration of FIG. 1, multiple video frames 110 are sequentially acquired each with a same exposure duration.

Figure 2:
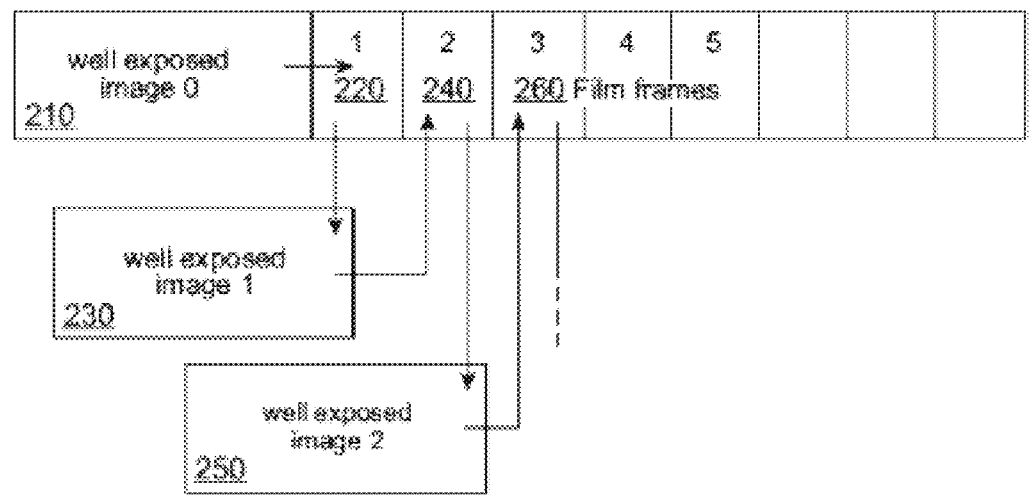
FIG. 2 schematically illustrates video frame enhancement using luminance and/or color data from a well-exposed image, and applying the data to a relatively less exposed, sharper image in accordance with a first embodiment.

FIG. 2 schematically illustrates use of frames with different exposure durations. A well-exposed frame 210 is acquired at a beginning of a video acquisition. From this well-exposed image 210, one may extract brightness and/or color information that are used to enhance the next frame 220. The next frame 220 is exposed using an exposure determined from a maximum frame-rate. The frame 220 is enhanced with brightness and/or color information extracted from the well exposed frame 210.

The frame 220 may be displayed (included in the video) and may be used for determining or generating another reference image 230 that may itself be used to enhance the next acquired frame 240 (frame 2). The reference frame 230 may be generated as a combination of the from acquired frame 210 and the second acquired frame 220.

The next acquired frame 240 is enhanced with brightness and/or color information extracted from the generated well exposed frame 230. The frame 240 may be displayed (included in the video) and may be used for determining or generating another reference image 250 that may itself be used to enhance the next acquired frame 260. The reference frame 250 may be generated as a combination of the generated frame 230 and the third acquired frame 240. The frame 260 may be displayed (included in the video) and the process may be repeated over a complete vide sequence.

The acquisition of the well exposed image may be repeated at certain times. A digital camera may be used that has an auto-exposure algorithm that runs in the video mode. The best exposure time for a frame may be estimated in-camera. The camera may be configured such that a well exposed image may be acquired only when the auto-exposure demands a period larger than the one imposed by the maximum frame rate.

If the entire video is acquired in low light then the amount of time when it is needed to repeat the image acquisition may depend on camera movement. This may be estimated by registration techniques. An example method may be performed by a processor as follows:

1. Test for Low-Light Case: the auto-exposure determined time is approximately equal to the maximum frame rate. The test should run continuously no matter which is the current case.
2. When the conditions are such that it is not a Low-Light Case, then normal acquisition may be performed with record of any well exposed image.
3. When the conditions are such that it is a Low-Light Case, then,
    a. Acquire a well exposed image and iteratively run the enhancing method for each video frame;
    b. Estimate the camera movement by performing registration on the recorded frames. If the motion is larger than a threshold (the image content has significantly changed, e.g., 30% from the last well exposed image), then acquire a new well-exposed image; and
    c. If a certain number of video frames (e.g., M=5, 10, 20, 30, 40, 50, 60, 75, or 100 or more) has been recorded from the last well-exposed image, then acquire a new well exposed image.

Video Frame Pairs with Modified Exposure Time

Figure 3:
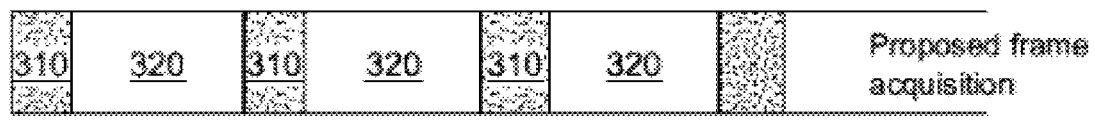
FIG. 3 schematically illustrates video frame enhancement using luminance and/or color data from a well-exposed image, and applying the data to a relatively less exposed, sharper image in accordance with a second embodiment.

FIG. 3 schematically illustrates use of video frame pairs with modified exposure times. In an example embodiment, we will consider only a video. The exposure times of the frames are modified from the example of FIG. 1 to provide a better response to a low-light scene. Traditionally, the exposure times of all the frames are equal (with $t_0$) as illustrated at FIG. 1. In the example of FIG. 3, the images may be grouped in pairs 210, 220, wherein the exposure time of a pair is $2t_0$, just as are two frames 110 in FIG. 1. FIG. 3 differs from FIG. 1, however, because for a pair in FIG. 3, there is an under-exposed frame 310 (with exposure time $kt_0$, k<1) and an "over-exposed" image 320 (with exposure time of $(2-k)t_0$). The "over-exposed" frames 320 are used for a better detection of the appropriate luminance level and of the color gamut, and therefore to enhance the under-exposed frames 310.

Choosing k: The enhancement method has a limitation. There is a maximum difference between the exposures of the two images (well exposed 320 and under-exposed frame 310), when the method works optimally. If the exposure difference is larger than this limit, the under-exposed image 310 will have more noise than is typically tolerated in a useful signal. The k is preferably chosen as small as possible (to expose as well as possible the "well-exposed image" 320), but its value is preferably kept in the mentioned method limits. Also, the exposure time of the well-exposed image 320, (2−k) $t_0$, is preferably not larger than the value chosen by the auto-exposure (which may be used as a global reference).

Video Frame Triplets with a Single Well Exposed Image

Figure 4:
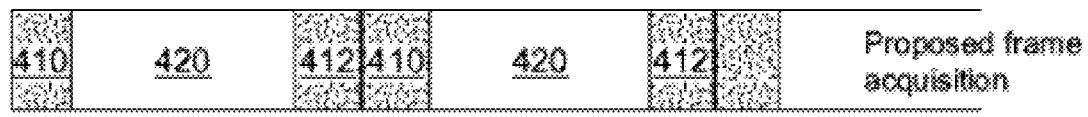
FIG. 4 schematically illustrates video frame enhancement using luminance and/or color data from a well-exposed image, and applying the data to a relatively less exposed, sharper image in accordance with a third embodiment.

FIG. 4 schematically illustrates a further embodiment which uses video frame triplets including one (or more) well-exposed image(s) 420 each with two or more under-exposed frames 410, 412. This embodiment provides a natural extension of the previous one described above with reference to FIG. 3, because the embodiment method illustrated at FIG. 3 does not require an order of the two images 310, 320. Therefore, the luminance and/or color information from the well exposed image 420 may be used to enhance the previous frame 410, as well as in the next frame 412. In such a scheme, as illustrated at FIG. 4, the maximum exposure may reach higher values, and the overall frame rate may be better from the point of view of the edges. In principle, each well-exposed image 420 may be used to enhance still further combinations of under-exposed images, e.g., two before and/or two after, or one before and two after, or one after and two before, or three before and/or after, etc.

Dual Frame Acquisition Pipeline

FIGS. 5a-5d schematically illustrate dual frame acquisition pipeline embodiments. FIGS. 5a-5d schematically illustrate video frame enhancement involving use of luminance and/or color data from a well-exposed image, and applying the data to one or more relatively less exposed, sharper image(s). FIGS. 5a-5d illustrate four alternative examples that are each in accordance with a fourth embodiment which involves at least two image acquisition sub-systems, where the time parameter is understood to go from left to right in FIGS. 5a-5d from earlier to later. In general, a well exposed image is captured with a first image acquisition sub-system that is optimized for longer exposure, while a relatively less exposed and sharper image is captured with a second such-system that is particularly optimized for sharpness.

Figure 5A:
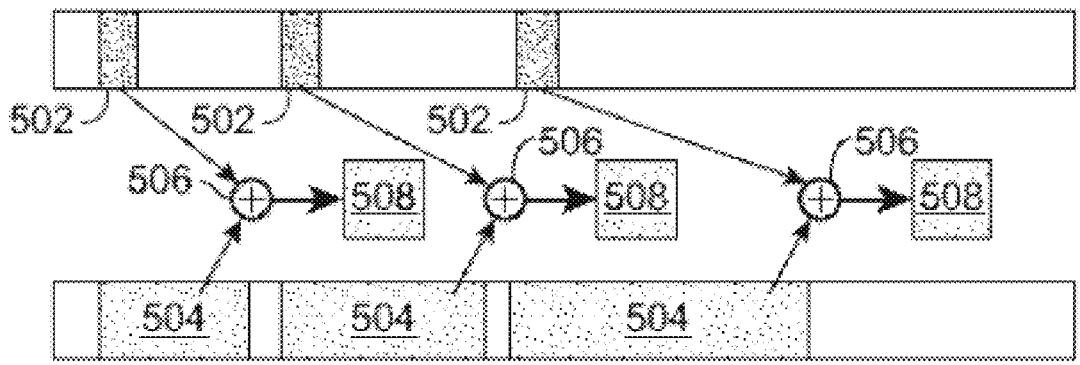
FIGS. 5a-5d schematically illustrate video frame enhancement using luminance and/or color data from a well-exposed image, and applying the data to a relatively less exposed, sharper image in accordance with a fourth embodiment which involves at least two image acquisition sub-systems, so that the well exposed image is captured with a first sub-system while the sharper image is captured with a second sub-system.
Figure 5B:
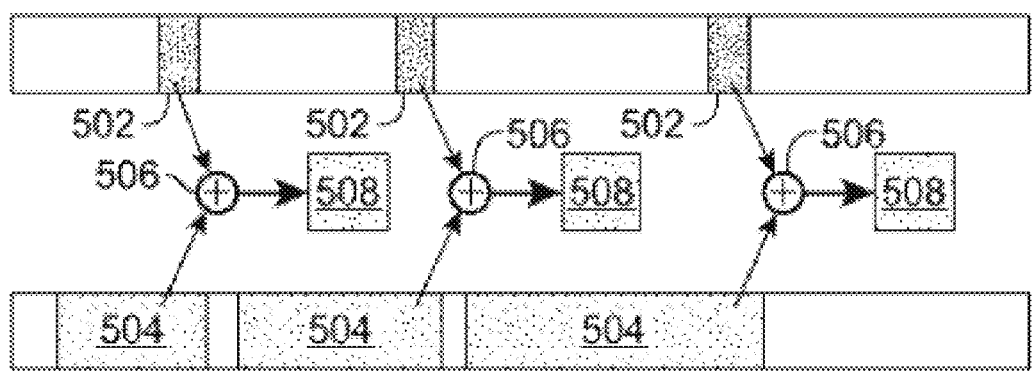

FIG. 5a illustrates short-exposure time (SET) frames 502 which are sharp, but underexposed. These frames 502 are aligned with the start of the full exposure time (FET) frames 504 with normal exposure, full color, but blurred. These frames 502, 504 are combined to generate enhanced video frames 508. FIG. 5b shows the case where the SET frames 502 are acquired towards the end of the FET frames 504. This illustrates that SET frames 502 can be acquired any time during the FET frame 504 in this embodiment.

FIGS. 5a-5b illustrates an embodiment wherein the elements 502 indicate video frames 502 that are acquired with shorter exposure times than element 504. This can be understood from the narrower extent of the frames 502 in the time dimension than the frames 504. The frames 504 are exposed for two to ten times as long (or longer, or just under 2× in some embodiments) compared with the frames 502, while in FIGS. 5a-5d the frames 504 are about 5× wider than the frames 502 indicating an exposure time of about 5× longer than for frames 504. The image combining unit (ICU) 506 combines luminance and/or color information from the frames 504 to enhance the frames 502. The combinations are images 508.

In FIG. 5a, each image 502 is acquired beginning about the same time as a corresponding image 504, even though the exposure of image 502 is ended longer before the exposure of image 504 is ended. In FIG. 5b, each image 502 is acquired in the last moment of acquisition of a corresponding frame 504, i.e., the exposures of the two IAS's are ended at about the same time even though the exposure of frame 504 was begun far sooner than that of image 502. Another embodiment would have the exposure of image 504 begin before the beginning of the exposure of image 502, and the exposure of image 502 is ended before the exposure of image 504 is ended, i.e., the frame 502 is acquired in the somewhere in the middle of the exposure of frame 504.

Figure 5C:
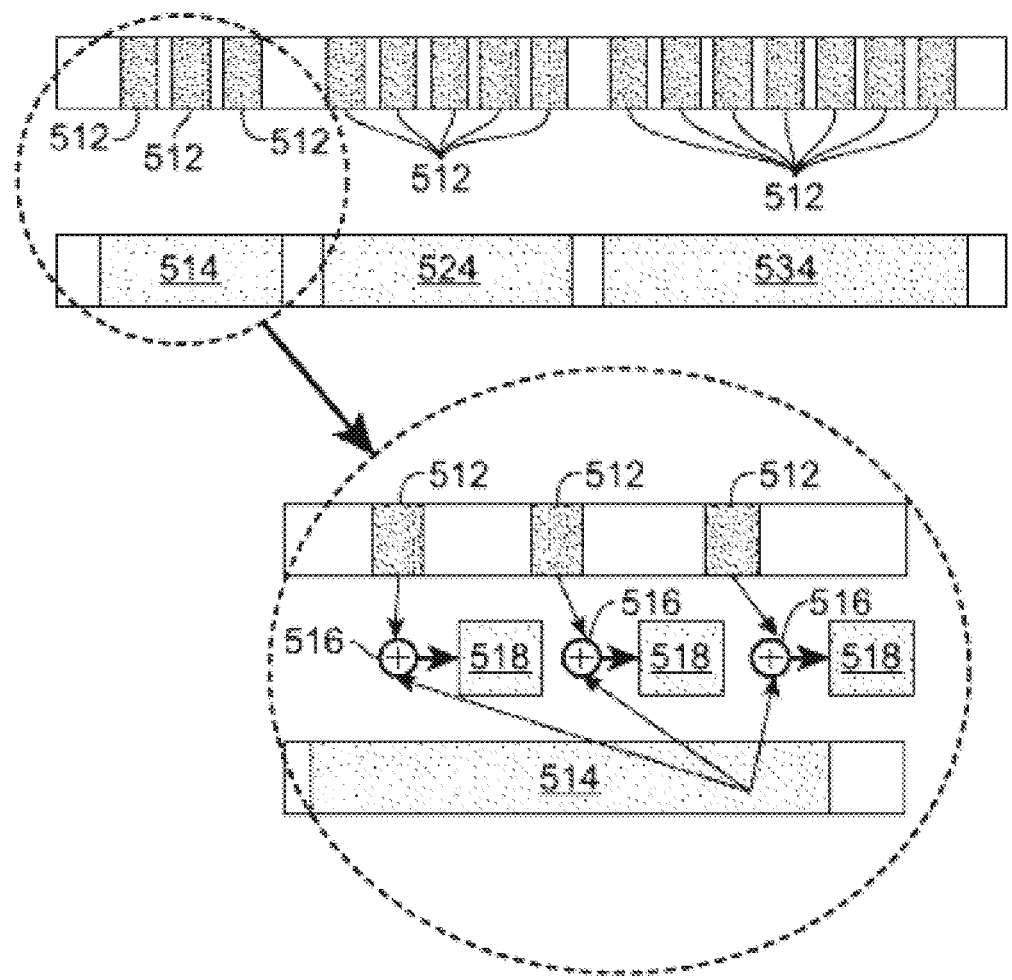
Figure 5D:
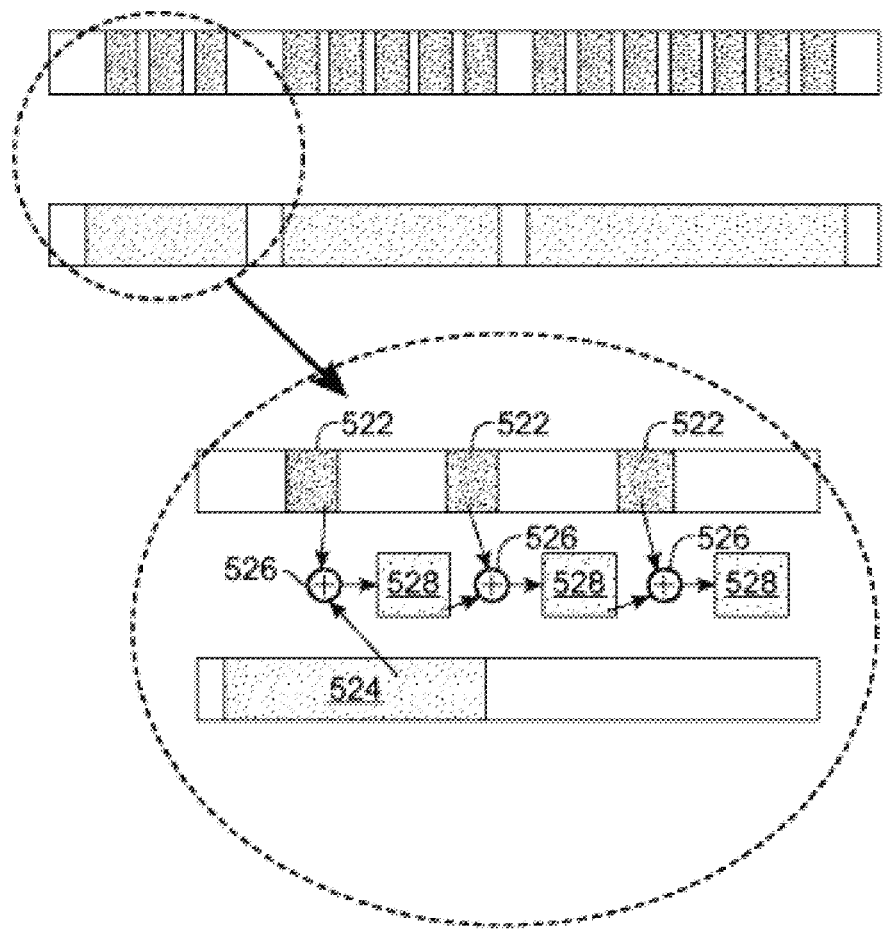

FIG. 5c illustrates a case of multiple SET frames 512 acquired within an exposure duration of a single FET frame 514. Each SET frame 512 can act as a "sharpening reference" for the FET frame 514 enabling multiple enhanced video frames to be resolved. This is advantageous for example in very low light, where it might take as long as 0.5 seconds for a sensor to achieve a full exposure. Using multiple SETs 512 within that 0.5 seconds permits a reasonable frame rate of 10-15 fps to be achieved with enhanced output frames in terms of sharpness, color and/or luminance.

FIG. 5c schematically illustrates a further embodiment where multiple, e.g., three, short exposure time (SET) frames 512 are acquired while a single longer exposure time frame (FET) 514 is acquired. In another example, five short exposure time frames 512 are acquired while a single longer exposure time frame 524 is acquired. In another example, seven short exposure time frames 512 are acquired while a single longer exposure time frame 534 is acquired. Alternatively, the shorter exposure time frames could be varied as well. In the first example of three SETs per FET, the ICU 516 combines the color and/or luminance information from frame 514 with each of the three frames 512 that were acquired during the exposure duration of the frame 514. The results are the three output images 518.

In FIG. 5c, the second (and subsequent) SET frame 512 could be combined with the first output video frame 518 rather than with the main FET frame 514 in the same way as an embodiment of the single acquisition channel aspect. Thus, in the example of FIG. 5d, the SETs and FETs may be similar to those described with reference to FIG. 5c. In this example, the color and/or luminance information initially extracted from frame 524 is applied to 522 at ICU 526 to get a first processed frame 528. In this example, color and/or luminance information is extracted from that first processed frame 528 and combined at ICU 526 with one or more subsequent shorter exposure frames 522 to get one or more subsequent processed frames 528. This example is particularly applicable also to the single IAS embodiment except without having temporal overlap.

In this fourth embodiment, a video camera incorporates two distinct image acquisition subsystems (IAS). In certain embodiments, each of the two IAS's includes at least an image sensor & (digital) post-processing components.

The first IAS may have an image sensor configured to acquire images at a higher frame rate and with optimal image sharpness. The frame rate for this first sensor may optionally be fixed and it may optionally incorporate an image buffer to temporarily store a plurality of these sharp images.

The second image acquisition subsystem may be configured to capture an optimally exposed image. As such, it should have a variable frame rate to allow for correct image exposure, even in low lighting conditions.

A timing or clocking unit may be used to maintain temporal synchronization between the two IAS's and to ensure that images in the fast IAS image buffer can be correctly matched to images obtained from the optimally exposed IAS. This timing function may be implemented either as a hardware unit, or as part of the firmware of a main CPU or DSP.

An additional image combining unit (ICU) selects one (or more) images from the fast IAS buffer and a corresponding image from the optimally exposed IAS buffer. The ICU may perform various operations such as those described at U.S. application Ser. No. 12/330,719 and/or U.S. application Ser. No. 11/856,721, which are incorporated by reference. The ICU may also be used with any of the first, second or third embodiments described above with references to FIGS. 2-4. The ICU generates a sequence of output images which combine the one or more sharper, underexposed images from the fast IAS buffer with the single optimally exposed image obtained from the optimally exposed IAS.

The system of the fourth embodiment may acquire images of both the fast IAS and the optimally exposed IAS with a same lens as optical input. That input is then split first and second image sensors. Alternatively, images may be acquired separate lens/sensor combinations. Such multiple lens subsystem may include 2, 3, 4 or more lenses. For example, U.S. Pat. No. 7,453,510, which is incorporated by reference, describes a multi-lens subsystem having particular embodiments with four lenses.

Parallax correction may also be provided, as has been provided in the past in "twin reflex" cameras. When the imaging device incorporates a sensor for measuring distance-to-subject, the resulting measure to the principle subject of the image may be employed to further enhance the parallax correction, and/or to determine if such correction is needed. When the imaging device incorporates a face defector and/or a face tracking unit, information regarding the size(s) of face(s) detected in the image may be used to further enhance the parallax correction, and/or to determine if such correction is needed. In general, when a subject is beyond a certain distance or "critical distance" (infinite focal length), e.g., three or four meters in common cameras, then parallax correction loses its advantage.

Techniques described in US published application 2007/0296833 and/or U.S. application Ser. No. 12/116,140, which are incorporated by reference, may be combined with features described herein, particularly to improve the acquisition, or pre-processing of the input images to the ICU, and/or to selectively enhance the output images from this unit.

Output images may be subsequently compressed to form an MPEG video sequence. US published application 2007/0025714 is incorporated by reference. In addition, the techniques described herein may be applied to a still image camera, whereas the sequence of images may be preview, post-view and/or in-whole or in-part contemporaneously acquired images that are generally captured to enhance capture conditions and/or post-processing of a main still image.

In a variant of the dual IAS embodiment, both IAS subsystems may share a common image sensor which employs a modified architecture. This embodiment does not have separate optical acquisition subsystems and associated parallax correction which would be involved in capturing close-up or portrait images.

In this variant embodiment, an image sensor may be partitioned such that every second row of sensor pixels is tied to a separate clock circuit. Thus, the acquisition time of the odd-numbered rows of the image sensor can be controlled independently of the even-numbered rows. Similarly the data outputs (pixel values) of these even and odd rows can be loaded onto independent data buses. Thus, by setting different acquisition times for the odd and even rows of sensor pixels, closely overlapping underexposed and normally exposed images may be advantageously acquired. Due to the close proximity of the odd and even pixel rows, there is a small, regular half-pixel offset in either horizontal or vertical orientation which can be compensated for, and as both underexposed and normally exposed images are acquired via that same optics subsystem, there is no parallax correction involved. As in other embodiments, the two independently acquired images may be combined using a single pass adaptive filter.

Bayer Pattern Partitioning of the Sensor

In another embodiment pairs of rows are linked for each of the different exposure times. Thus, an entire RGB Bayer set corresponding to a single RGB pixel will have the same exposure time i.e., rows n+1, n+2 have a short exposure, while rows n+3, n+4 have a normal (less sharp or relatively more blurred) exposure.

Considering the exposure time of the underexposed rows is $T_U$, while for the normally exposed rows is $T_N$, an example acquisition procedure is as follows;

Start exposure for all rows of the image sensor (i.e., for both the underexposed rows and the normally exposed rows);

After $(T_N - T_U)$ seconds, reset (or discharge) the odd rows;

After $T_N$, all the rows are read (i.e., both the underexposed and normally exposed rows). Two images are formed with half resolution; and The underexposed image is interpolated to full resolution.

An example choice is to have $T_N = kT_U$, where k is an integer scalar. This means that the normal exposure time is a multiple of the short exposure time. Such constraint may be met, e.g., if the exposure time is reduced by an amount of Ev (or Fstop) values. For instance, an under-exposure with one (1) Fstop implies $T_N = 2T_U$. This constraint has at least the following benefits:

Using the same sampling frequency, all the locations (from the image sensor) can be read synchronously;

When all the operations are pixel-wise (or use only pixels from two consecutive rows), there is no need for an extra image buffer. The resulting image is built in real-time, while reading. The interpolation operation is performed locally.

An advantage of this split-sensor acquisition embodiment is that the two images are spatially aligned (insofar as is possible given the constraint that one image is blurred) and hence pixel-wise (for each location independently) operations are possible without a need to acquire and align the entire images.

A further advantage is that the acquisition of the two images can handled by two independent data busses, enabling the two images to be obtained with a close temporal overlap.

Image Mixing

This offers an alternative approach to the combination of the two images using a single pass adaptive filter. In one example, a process may involve the following two steps:

The first step is about combining the underexposed image F and the blurred image G, by some point-wise amplification algorithm to produce an image, called $F_{amp}$, and which has a luminance and color levels at least very close to the ones present in the blurred image G. The resulting image $F_{amp}$ has reasonable, but not perfect, luminance and color levels. Because the amplification is performed on each pixel independently, the amplified image will have the same resolution as the under-exposed image, which is the desired resolution.

As a second step, the final image, $F_{out}$ may be computed as a linear combination (implemented independently on each pixel) between the blurred image, G, and the amplified image $F_1$. An example solution to perform this operation is:

Use the YUV plane for performing the calculus;
A luminance of the output image may be expressed as:

$$Y(F_{out})=0.9*Y(F_{amp})+0.1*Y(G);$$

A color difference plane of the output image may be expressed as:

$$U(F_{out})=0.3*U(F_{amp})+0.7*U(G); \quad (i)$$

$$V(F_{out})=0.3*V(F_{amp})+0.7*V(G); \quad (ii)$$

The system of the fourth embodiment may be applied to other fields of image processing. For example, improved Dynamic Range Compression (DRC) may be achieved using a pair of symmetrical, synchronized sensors. In this embodiment, one of the pair of symmetrical, sychronized sensors may be used to expose correctly, while the other is used to capture over-exposed images, or under-exposed images. The dark areas, or light areas, can be improved drastically, e.g., in terms of increased sharpness, color balance, and/or white balance, and/or reduced blurriness.

In another example, hand motion compensation and low lighting video/still image enhancement can be improved. In this example, one normally exposed image and another under-exposed image (e.g., half-exposed, one-third exposed, one-quarter exposed, one-fifth exposed, or less). Adaptive filtering may be used to combine the images.

In a further embodiment, a third dimension may be added to an image. This feature can be used in an enhanced face recognition technique, or to render, process, store, transmit or display an improved 3D representation.

In another embodiment, improved face tracking is performed. In this case, two face detections are performed on two different image streams. One detection may be over-exposed (or under-exposed), and the other may be normally exposed. In this case, e.g., back-lit objects and other difficult lighting conditions can be advantageously handled more efficiently and effectively and with improved results.

In another embodiment, red eye detection and correction is improved using a still image version of the dual frame pipeline embodiment. There can appear color exact shifts between pictures obtained by two such sensors. That can provide an advantageous verification filter, e.g., to confirm that detected red pixels are indeed red eye artifacts.

In a further embodiment, foreground/background separation techniques can be enhanced using a dual frame pipeline. For example, one sensor may capture a focused image, while the other is used to capture an at least slightly de-focused image. Advantageous separation between background and foreground can be thereby achieved allowing for the creation of high quality portraits with inexpensive and/or relatively simple optics.

In another example, one sensor may be used to capture IR images or images that include an IR component. Such sensor can be provided by removing an IR filter of certain sensors and/or adding a visible light filter. Such IR sensor would be advantageous in performing image processing and image capture in lowlight conditions, and in a still image embodiment for performing red eye detection and correction.

Other examples include noise reduction and/or processes involving capturing non-scene shot images to be further used as additional camera features. For example, an eye iris analysis tool may be embedded in a digital cameras that has an eyepiece viewfinder. The image of the iris looking through the eyepiece may be captured by the camera CCD, or an additional CCD, after being diverted by one or more optics. The image of the iris may be analyzed and used for biometric user identification (camera, lock, digital picture watermarking), inferring lighting conditions, detecting user fatigue, and/or detecting certain symptoms of a medical condition of a user.

A low-resolution camera looking back at a user's face may be embedded in a digital camera. The image of the user's face may be captured by the camera CCD, or an additional CCD, after being acquired and processed by one or more optics. This can be used for face identification for camera usage protection, IP protection for digital pictures, and/or analysis of user emotions based on the face and/or as feed-back of the user emotions into the captured image itself.

In another embodiment that is particularly advantageous for lowlight conditions, a reduced frame rate may sometimes be used in order to increase the exposure duration to gather more light. If multiple sensors are used, e.g., two (although three or more may be used), then a faster frame rate will result in sharper images. For example, even frames may be acquired with one sensor, and odd frames with another sensor (or for three sensors, every third frame is acquired with each of the three sensors, or for four sensors, etc).

The sensors will generally have the same exposure (e.g., for two sensors, the time T may be about twice the frame rate), but one sensor will start acquiring image data at t=0, and the second sensor will start at t=T/2.

Alternative to the previous embodiment dial is particularly advantageous for lowlight conditions, instead of or in addition to increasing (or decreasing) exposure time, a larger aperture can be set. While depth of field will be smaller such that a subject with background would be defocused, the frame rate can be advantageously higher than the example of increasing the exposure time. With dual sensors and optical elements, both lenses can be set to large aperture, where one is focused one the background and the other is on the subject. The two resulting pictures can be combined, in one high-frequency picture, where both the subject and background are in focus (the two images are complementary, where one has high frequencies the other has low frequencies). So in lowlight, exposure time can be kept short and ISO small, with fully open aperture, wherein two short DoF images are combined into one with good focus both on subject and background.

In a de-noising algorithm, two images can be acquired with one overexposed and the other normally exposed. The normally exposed image may be de-noised using information from the overexposed image. An adaptive algorithm may be used as a function of illumination of the pixels, because lower illuminated pixels exhibit greater noise.

In a further embodiment, a two lens system can be used in another embodiment as follows. One lens may capture certain scenery broadly, e.g., a tourist either standing relatively close to a camera with the Egyptian pyramids far away from the camera and tourist, or the tourist standing further from the camera and closer to the pyramids and looking very small. The other lens is used to zoom and focus on the tourist or other main subject from the scene.

A single file or multiple files may then store the two images. The two images can be acquired at the same time with a system in accordance with the dual image pipeline embodiment, or proximate in time in the single optical system embodiments. An advantage is that, while having a panoramic image, them will still be excellent detail in the main part or subject of the scene (e.g., the tourist or more particularly the face of the tourist). In one embodiment, the wide-angle scene may use a face tracker to determine the location of a face or faces in the scene, and the zoom/aperture of the second imaging system may be adjusted to include people detected in the captured image. In an alternative embodiment both wide-angle and narrow angle images of the scene may be captured and subsequently combined into one or more composite images. In another embodiment, selective high-quality compression of a face region may be enabled in a portrait (e.g., using a zoom lens), with lower-quality compression applied to the background image (e.g., using a wide-angle lens).

Wavefront coding may also be provided. Variable focus is used for different parts of a lens. Various parts of the lens capture information relating to different focal points. The image is decoded according to known defocus variations and a resulting image has an extended depth of field. CDM Optics have studied this technology, and http://www.cdm-optics.com is incorporated by reference.

Phase retrieval and/or phase diversity may also be provided. Two images are captured simultaneously with a system in accordance with the dual pipeline embodiment. One image is in focus, and another is defocused by a known distance. The two images are recombined and the known defocus distance which distorts the image is used to reconstruct the image with a greater depth of field. A beam splitter could also be used to capture the defocused image to apply phase diversity.

Tone Mapping for Low Light Image Enhancement

A tone mapping function may be applied by differentiating two images which have identical or approximately the same spatial content. The difference between the two may be the intensity of light and of the colors. That is, one is well-exposed while the other is under-exposed. In accordance with certain embodiments, the matching may be generally exact, without any approximation, due to the same raw images being used to generate mean and sum images with which the tone mapping is performed.

Movies taken in low-light conditions, at 30 fps, tend to result in very dark, under-exposed images that have a very low contrast. Improving such images implies using tone mapping algorithms that, although give a better exposed image, have many difficulties in restoring the natural colors of the scene. On the other hand, images taken in the same conditions at a sufficient exposure time have natural colors and a good contrast but a poor quality when local or global motion is present. A tone mapping function may be advantageously determined in accordance with certain embodiments by differentiating two images which have identical or substantially the same spatial content.

An advantageous technique works in accordance with certain embodiments as follows. For a sequence of under-exposed images, the equivalent blurred but well-exposed image is computed from the sum of the images in RAW format (Fsum). $Fsum=F1+F2+\ldots+FN$, where: $F1, F2, \ldots, FN$, are low light RAW images—The same set of images $F1, F2, \ldots FN$ is available as final (camera processed) images $G1, G2, \ldots GN$. This is true for the sum image: $Fsum \rightarrow Gsum$. The Gi images are given in the RGB color space.

After the in camera processing is done, a mean image for the sequence of final images is computed: $Gmean=(G1+G2+\ldots+GN)/N$. The Gmean image has similar exposure and contrast, as well as colors, as the images in the sequence ($G1, G2 \ldots GN$), but has the exactly same content as the well-exposed image (Fsum). Both are degraded by the same motion blur.—The underexposed images, $G1, G2, \ldots GN$, are improved by a logarithmic tone mapping transformation which increases contrast and visibility but does not give the same colors as a good exposure. The tone mapping transformation may be represented as follows: $Hi=f(Gi)$, where f is a logarithmic tone mapping function.

A RGB->YUV transformation is applied. Hence Hi_YUV are given in the YUV color space.—In the same manner, Gsum_YUV is obtained out of Gsum (which came from the sum of the RAW images, Fsum)—Now the Gsum_YUV (well-exposed image) are compared with Hmean_YUV (under-exposed image).—Working on the YUV color space, the chrominance pairs from the transformed under-exposed image (Hmean_YUV) are mapped to chrominance pairs (U,V) computed from the well-exposed image (Gsum_YUV).

The pixels that have a certain chrominance pair in (Hmean_YUV) will be mapped to a chrominance pair computed as the mean of the chrominance pairs of the corresponding pixels in Gsum_YUV.—For each image, Hi_YUV, in the sequence, the chrominance pairs of the pixels are replaced by the corresponding chrominance pair from the maps previously created. The images can have slightly different chrominance which are not found in the mean image, in which case these may be replaced by the closest pair of chrominance (using Euclidian distance) found in the mean image, while the differences are unnoticeable to the human eye.—The YUV-> RGB transformation is applied and the transformed image has similar color with the well-exposed image, without being affected visibly by the motion blur.

The process may be implemented on a typical digital camera platform that provides special access to the RAW images. The computation can be done with a typical CPU or with dedicated ASIC.

Figure 6:
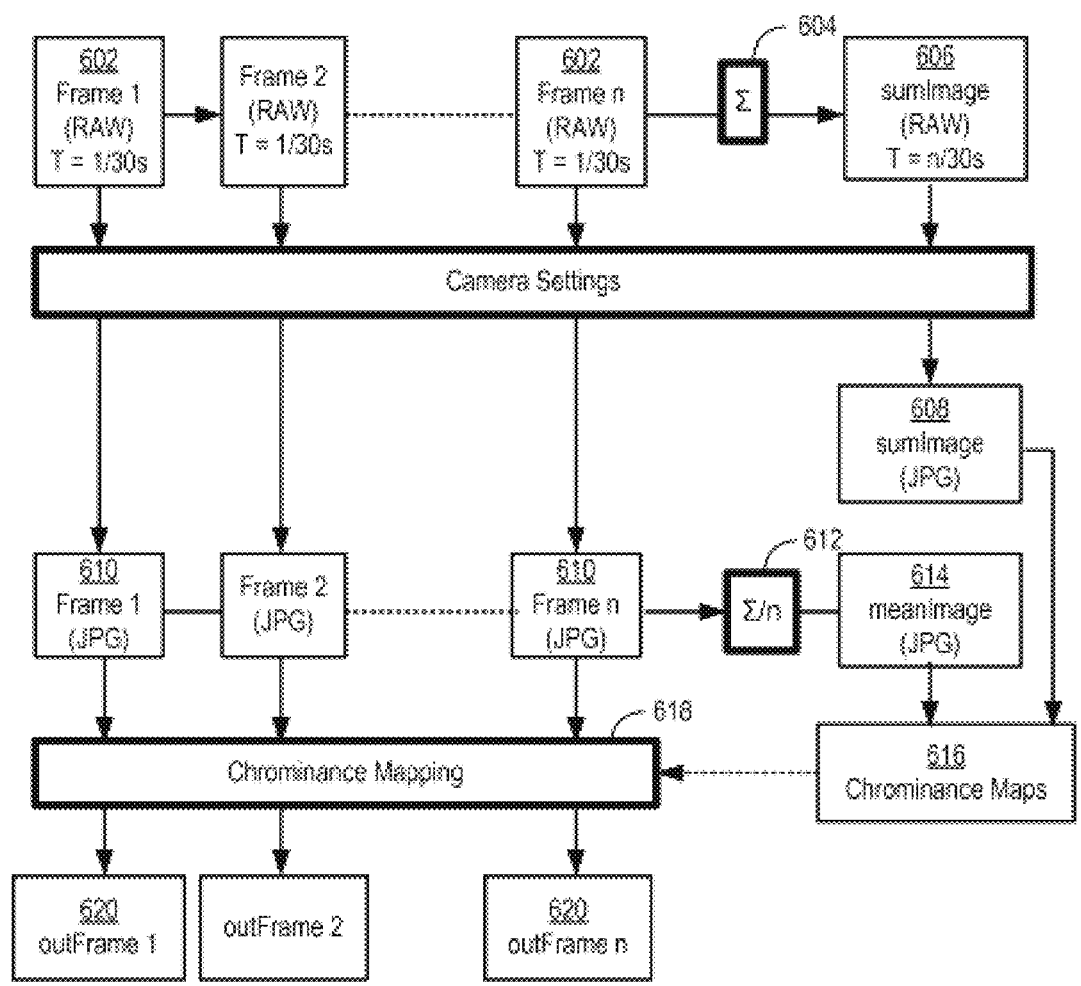
FIG. 6 schematically illustrates video and/or still frame enhancement in accordance with certain embodiments.

FIG. 6 schematically illustrates video and/or still frame enhancement in accordance with certain embodiments. The n frames of RAW image data 602 are summed 604 to obtain a RAW sum image 606. A JPG sum image 608 based on the RAW sum image 606 is also generated. This JPG sum image 608 contains sufficient chrominance information, whereas the n frames of RAW image data 602 are based on "under-exposed" images which have insufficient chrominance information. The under-exposed RAW images are however sharper than the sum image 608. Put differently, the sum image tends to have sufficient chrominance information but is blurry, similar to a well-exposed or otherwise sufficiently exposed image (i.e., having significantly longer exposure than that of the RAW images 602), particularly in comparison to the sharp, under-exposed images. In addition, frame by frame JPG images 610 are generated based on the n frames of RAW image data 602. A mean 612 is computed of the JPG images 610 as a mean JPG image 614. Chrominance variables of pixels of the mean image 614 are mapped to chrominance variables of pixels of the sum image 608, and chrominance maps 616 are generated. The frame by frame JPG images are chrominance mapped 618, and n outframes 620 are obtained as a result.

This advantageous solution illustrated schematically in FIG. 6 determines a tone mapping function by differentiating two images which have substantially identical spatial content; the difference between the two is the intensity of light and color: one is well-exposed while the other is underexposed. Because the sum image 608 is based on a sum of the RAW image 602, compared to being separately acquired from the RW images 602, the matching is more exact, such that approximations for alignment and pixel-wise mapping are less dramatic, reduced or eliminated altogether.

An advantageous algorithm in accordance with certain embodiments can combine information from both of the previously mentioned situations. The following is a non-limiting example. For a sequence of under-exposed images, the equivalent blurred but well-exposed image is computed from the sum of the images in RAW format (Fsum). For example, Fsum=F1+F2+ . . . +FN, where F1, F2, . . . , FN, are low light or under-exposed RAW images.

The same set of images F1, F2, . . . FN is available as final (camera processed) images G1, G2, . . . GN. This is true for the sum image: Fsum–>Gsum. The Gi images may be given in the RGB color space in this example.

After all in camera processing is done, a mean image for the sequence of final images is computed: Gmean=(G1+G2+ . . . +GN)/N. The Gmean image has similar exposure and contrast, as well as colors, as the images in the sequence (G1, G2 . . . GN), but has the same content as the well-exposed image (Fsum). Both are degraded by the same motion blur.

The underexposed images, G1, G2, . . . GN, are improved by a logarithmic tone mapping transformation which in accordance with certain embodiments, which increases contrast and visibility but does not give the same colors as a well-exposed, or sufficient exposed image. The tone mapping transformation may be characterized as Hi=f(Gi), where f may be a logarithmic tone mapping function, or an alternative tone or color mapping function.

A RGB–>YUV transformation may be next applied. Hence Hi-YUV may be given in the YUV color space. In similar manner, Gsum-YUV may be obtained from Gsum (which came from the sum of the RAW images, Fsum).

Now the Gsum-YUV (well-exposed image) are compared with Hmean-YUV (under-exposed image). Working on the YUV color space, the chrominance pairs from the transformed under-exposed image (Hmean-YUV) are mapped to chrominance pairs (U,V) computed from the well-exposed image (Gsum-YUV). The pixels that have a certain chrominance pair in (Hmean-YUV) will be mapped to a chrominance pair computed as the mean of the chrominance pairs of the corresponding pixels in Gsum YUV.

For each image Hi-YUV in the sequence, the chrominance pairs of the pixels are replaced by the corresponding chrominance pairs from the maps previously created. The images can have slightly different chrominance which are not found in the mean image, in which case these may be replaced by the closest pair of chrominance (using Euclidian distance) found in the mean image. These differences are generally unnoticeable to the human eye.

The YUV–>RGB transformation is now applied. The transformed image has similar color with the well exposed image, yet advantageously without being affected visibly by the motion blur.

Figure 7A:
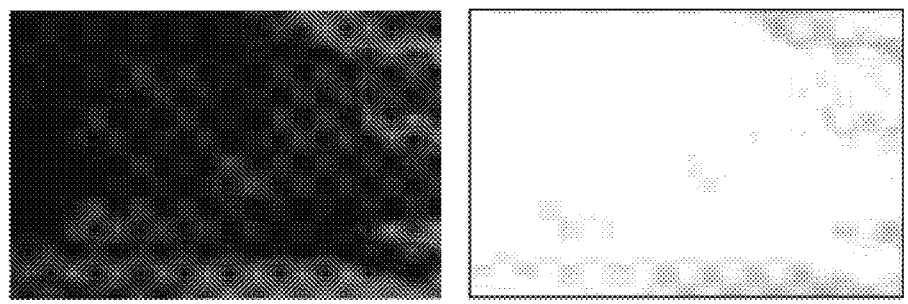
FIGS. 7a-7d illustrate enhancement of a low-light image in accordance with certain embodiments.
Figure 7B:
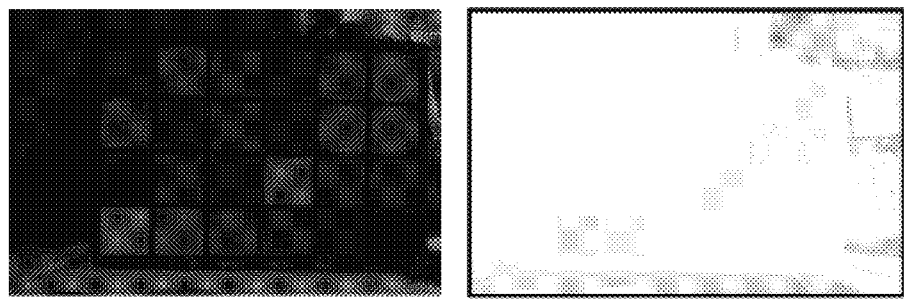
Figure 7C:
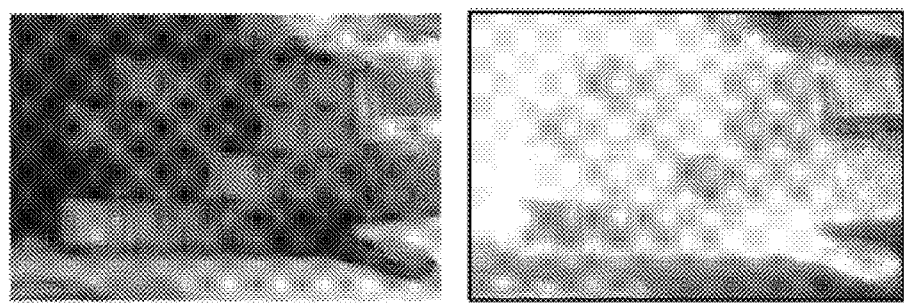
Figure 7D:
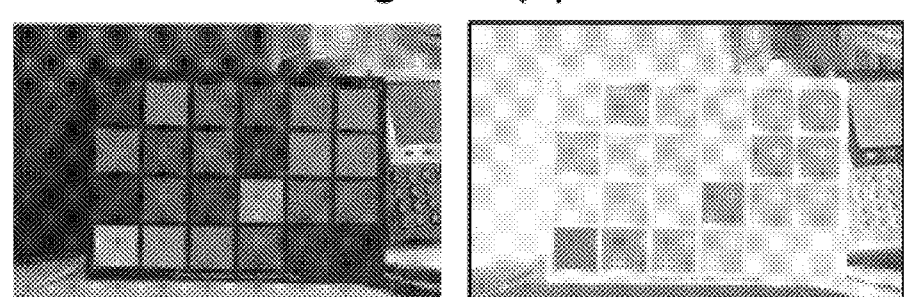

FIGS. 7a-7d illustrate enhancement of a low-light image in accordance with certain embodiments. FIG. 7a illustrates a mean image of the sequence of low-light (under-exposed) images. An initial, under-exposed image is illustrated at FIG. 7b. As shown, the under-exposed (low-light) image of FIG. 7b is sharp yet fails to have optimum color and brightness. Corresponding correctly exposed images are illustrated in FIG. 7c showing sufficiently color and brightness, yet being blurry. An example of a final, enhanced image is shown in FIG. 7d. Clearly, the final image of FIG. 7d is sharper than the well-exposed or otherwise sufficiently exposed image of FIG. 7c, and has improved color and brightness compared with the under-exposed images of FIGS. 7a and 7b.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents. For example, any of the following alternative features may be combined into alternative embodiments:

Alternative Embodiments

A method of combining image data from multiple frames to enhance one or more parameters of digital image quality is provided, which uses a processor and at least one video acquisition system including a lens and an image sensor. The method includes acquiring a first image at a first exposure duration, as well as acquiring a second image at a second exposure duration shorter than the first exposure duration and at a time just before, just after or overlapping in time with acquiring the first image, such that the first and second images include approximately a same first scene. In this way, the second image is relatively sharp and under-exposed, while the first image is relatively well-exposed and less sharp than the second image. Brightness and/or color information are extracted from the first image and applied to the second image. The brightness and/or color information is/are extracted from the first image to generate an enhanced version of the second image enhanced in terms of brightness and/or color quality. The enhanced version of the second image is displayed, stored, transmitted, and/or streamed. The digital images may be video or still images.

The method may further include applying to one or more further images the brightness and/or color information extracted from the first image to generate enhanced versions of the one or more further images enhanced in terms of brightness and/or color quality. The one or more further images may be acquired at or near the second exposure duration and at a time or times just before or just after, or both, the acquiring of the second image, such that the one or more further images, include approximately the same scene as the first and second images.

The method may also include acquiring a third image at or near the first exposure duration when a predetermined number of multiple frames has been recorded since the acquiring of the first image. A fourth image may also be acquired at or near the second exposure duration and at a time just before, just after or overlapping in time with the third image, such that the third and fourth images include approximately a same second scene different from or same as the first scene. Brightness and/or color information are extracted from the third image, and applied to the fourth image to generate an enhanced version of the fourth image enhanced in terms of brightness and/or color quality. The enhanced version of the fourth image is displayed, stored, transmitted, and/or streamed.

The method may further include acquiring a third image at or near the first exposure duration when a predetermined amount of camera movement has been detected since the acquiring of the first image. A fourth image may be acquired at or near the second exposure duration and at a time just before, just after or overlapping in time with the third image, such that the third and fourth images include approximately a same second scene different from the first scene due at least to the camera movement. Brightness and/or color are extracted from the third image, and applied to the fourth image to generate an enhanced version of the fourth image enhanced in terms of brightness and/or color quality. The enhanced version of the fourth image is displayed, stored, transmitted, and/or streamed.

The method may also include acquiring a third image at or near the first exposure duration including combining some of the data from the first image with some or all of the data from the second image. A fourth image may be acquired at or near the second exposure duration and at a time just before, just after or overlapping in time with the third image, such that the third and fourth images include approximately the same first scene. Brightness and/or color information are extracted from the third image and applied to the fourth image to generate an enhanced version of the fourth image enhanced in terms of brightness and/or color quality. The enhanced version of the fourth image is displayed, stored, transmitted, and/or streamed within a video or still image sequence. The method may include repeatedly iterating the method as the scene evolves with time and/or camera movement.

The method may include iteratively alternating acquisition of well-exposed and sharp, under-exposed images; extracting brightness and/or color information from the well-exposed images; and applying to the sharp, under-exposed images the brightness or color information, or both, extracted from the well-exposed images to generate enhanced versions of the sharp, under-exposed images enhanced in terms of brightness or color quality, or both; and displaying, storing, transmitting, or streaming the enhanced versions of the sharp, under-exposed images.

The method may also include iteratively performing the following:
  acquiring two sharp, under-exposed frames and a well-exposed frame;
  extracting brightness and/or color information from the well-exposed frame;
  applying to each pair of sharp, under exposed images respectively captured immediately before and immediately after the acquiring of each well-exposed frame the brightness and/or color information extracted from the well-exposed frame to generate enhanced versions of each of the pair of sharp, under-exposed images enhanced in terms of brightness and/or color quality; and
  displaying, storing, transmitting, or streaming the enhanced versions of the pair of sharp, under-exposed images.

The method may utilize separate image acquisition subsystems (IAS's) for acquiring the first and second images. The separate IAS's may include first and second IAS's, wherein the first IAS is configured to acquire images at a faster frame rate than the second IAS. The first IAS may be specially configured to capture relatively sharp, under-exposed images and the second IAS may be specially configured to capture well-exposed and less sharp images. The first IAS may have a fixed frame rate. The second IAS may have a variable frame rate configured for capturing optimally-exposed images under different lighting conditions. The method may include acquiring both the first and second images with a same lens as optical input, and splitting the optical input between first and second mage sensors. The method may alternatively include acquiring the first and second images, respectively, with a first lens/sensor combination and a second lens/sensor combination. In this alternative, parallax correction may be applied.

In accordance with another embodiment, an mage processing apparatus is arranged to process a first underexposed and sharp image of a scene, and a second image relatively well exposed and blurred compared to said first image, nominally of the same scene. The first and second images are derived from a same image source or from respective image sources in this embodiment. An adaptive filter may be arranged to scan across the first and second images to provide a portion of the first image as an input signal to the adaptive filter. A corresponding portion of the second image may be provided as a desired signal to the adaptive filter. Filter coefficients may be calculated for this portion of the images based on a comparison of the input signal and a function of the desired signal and existing filter coefficients. The adaptive filter may be arranged to produce an output signal from the input signal based on the filter coefficients. An image generator may be arranged to construct a first filtered image from the output signal, relatively less blurred than the second image.

The first and second images may be in RGB format and the image portions may include a respective color plans of the first and second images. Each color plane of the first filtered image may be constructed from a combination of the filter coefficients and the input signal color plane information.

The first and second images may be in YCC format and wherein the image portions may include a respective Y plane of the first and second images. The constructing of the first filtered image may involve use of the output signal as a Y plane of the first filtered image and Cb and Cr planes of the input image may be used as the Cb and Cr planes of the first filtered image.

A portion of the first filtered image may be provided as the input signal to an adaptive filter. A corresponding portion of the second image may be provided as a desired signal to the adaptive filter. The technique may further include adaptively filtering the input signal to produce a further output signal. A further filtered image may be constructed from the further output signal less blurred than the first filtered image.

The first and second images may be in RGB format and, for producing the first filtered image, the image portions may include a respective color plane of the first and second images. The providing of a portion of the first filtered image may include converting the first filtered image to YCC format. The second image may be converted to YCC format, the image portions for further adaptive filtering may include a respective Y plane of the converted images.

The first and second images may be in YCC format and, for producing the first filtered image, the image portions may include a respective Y plane of the first and second images. The providing of a portion of the first filtered image may include converting the first filtered image to RGB format. The second image may be converted to RGB format, and the image portions for further adaptive filtering may include a respective color plane of the converted images.

The linage source for the second image may be of a relatively higher resolution than the image source for the first image. The first image source may be aligned and interpolated to match the alignment and resolution of the second image source. A point spread function, PSF, may be estimated for the second image. The second image may be de-blurred with the point spread function. The de-blurring may be performed in response to the PSF being less than a pre-determined threshold.

The image source for the second image may be of a relatively lower resolution than the image source for the first image. The second source may be aligned and interpolated to match the alignment and resolution of the first source. It may be determined that the first and second sources are misaligned by more than a pre-determined threshold, and the desired signal may be provided from a linear combination of the first and second image sources. Responsive to determining that the first and second sources are misaligned by more than a pre-determined threshold, the desired signal may be provided from a combination of phase values from one of the first and second image sources and amplitude values for the other of the first and second image sources.

The adaptive filtering may be performed row-wise and/or column-wise on the input signal.

The luminance characteristics of the under exposed image may be amplified prior to the adaptive filtering.

Noise filtering may be performed on the first filtered image. Color correction may be applied to the first filtered image and/or the noise filtered image.

The first image may be one of an image acquired soon before or after the second image, or temporally overlapping the second image.

A technique in accordance with certain embodiments may involve acquiring a first partially exposed image from an image sensor, acquiring a second further exposed image from the image sensor, subsequently resetting the image sensor. The first image may be obtained by subtracting the first partially exposed image from the second further exposed image. The second image may be obtained from the image sensor according to certain embodiments immediately prior to the resetting.

In another alternative embodiment a color filter enhancement method for a portable digital image acquisition device uses optics, a color sensor array and a processor to acquire and process digital images. A first relatively underexposed and sharp image of a scene ("sharp image") is obtained by exposing a first set of pixels of the sensor array. A second relatively well exposed and blurred image of the same scene ("blurred image") is acquired by exposing a second set of pixels of the sensor array for a longer duration than the sharp image. The second set of pixels in accordance with certain embodiments interleaves the first set of pixels. Color and/or luminance information may be applied from the blurred image to the sharp image, thereby constructing a color-enhanced and/or luminance-enhanced version of the sharp image.

The obtaining of the blurred image may include digitally exposing color pixels of the sensor array for a first digital exposure duration. The obtaining the sharp image may include digitally exposing white pixels of the sensor array for a second digital exposure time shorter than the first digital exposure duration. The constructing of the color-enhanced and/or luminance-enhanced version of the sharp image may include using data from both the color pixels exposed for the first digital exposure duration and the white pixels exposed for the second digital exposure duration. The digitally exposing of the color pixels and the white pixels for different exposure times may include clocking the color pixels and the white pixels independently. The digitally-exposing of the color pixels and the white pixels for different exposure times may involve sensor data acquired over different and/or overlapping temporal ranges, e.g., a first temporal range corresponding to the digitally-exposing of the color pixels may include an entire second temporal range corresponding to the digitally-exposing of the white pixels.

The color pixels may exhibit greater motion blurring effect than the white pixels due to the color pixels being digitally-exposed for a longer duration than the white pixels. The technique may involve compensating blurring in the color pixels using less-blurred data from the white pixels.

In certain embodiments the second digital exposure time may include not more than half of the first digital exposure time, or approximately a third of the first digital exposure time.

The color sensor array may include a CMOS-based sensor.

The technique may involve transmitting, storing and/or displaying the color-enhanced and/or luminance-enhanced version of the sharp image, and/or a further processed version.

In addition, in methods that may be performed according to preferred and alternative embodiments and claims herein, the operations have been described in selected typographical sequences. However, the sequences have been selected and so ordered for typographical convenience and are not intended to imply any particular order for performing the operations, unless a particular ordering is expressly indicated as being required or is understood by those skilled in the art as being necessary.

Many references have been cited above herein, and in addition to that which is described as background, the invention summary, brief description of the drawings, the drawings and the abstract, these references are hereby incorporated by reference into the detailed description of the preferred embodiments, as disclosing alternative embodiments of elements or features of the preferred embodiments not otherwise set forth in detail above.

A single one or a combination of two or more of these references may be consulted to obtain a variation of the preferred embodiments described in the detailed description above. In addition, the following are incorporated by reference, particularly for this purpose: U.S. Pat. Nos. 7,336,821, 7,369,712, 7,315,630, 7,316,631, 7,403,643, and 7,460,695, and US Patent Published Application nos. 2009/0303342, 2005/0041121, 2008/0043121, 2006/0204034, 2005/0068452, 2006/0120599, 2006/0098237, 2006/0039690, 2007/0147820, 2007/0189748, 2009/0003652, published PCT application nos. WO2007/142621, and WO2008/017343, U.S. patent application Ser. Nos. 11/573,713, 12/042,335, and 10/764,339, 12/042,104, 12/330,719, 11/856,721, 12/026,484, 11/861,854, 12/354,707, and 12/336,416. In addition, US published applications nos. 2003/0169818, 2003/0193699, 2005/0041123, 2006/0170786, and 2007/0025714 are incorporated by reference, particularly as disclosing alternative embodiments relating to still image cameras and/or the fourth embodiment "Dual Image Acquisition Pipeline".

What is claimed is:

1. An image processing method, comprising:
   acquiring a first well-exposed image frame of a scene;
   acquiring additional image frames of the same scene;
   wherein the additional image frames include a second image frame and a third image frame;
   generating one or more combined images based on the well-exposed image frame of the scene and at least one of the additional image frames;
   determining a frame-to-frame motion between the second image frame and the third image frame; and
   responsive to said frame-to-frame motion exceeding a threshold, acquiring a second well-exposed image frame of the scene.

2. The image processing method of claim 1, further comprising:
   after acquiring the second well-exposed image frame, acquiring second additional image frames of the scene;
   generating one or more combined images based on the second well-exposed image frame and at least one of the second additional image frames; and
   acquiring a third well-exposed image frame responsive to the number of second additional image frames exceeding a threshold.

3. The image processing method of claim 1,
wherein the frame-to-frame motion is determined from a registration of the additional image frames.

4. The image processing method of claim 1,
wherein the additional image frames are frames that are exposed using an exposure determined from a maximum frame-rate.

5. The image processing method of claim 1,
wherein the one or more combined images are generated based on the well-exposed image frame of the scene and the additional image frames of the same scene until one or more conditions are satisfied, wherein the one or more conditions include:
the frame-to-frame motion between two particular additional image frames, from the additional image frames, exceeds the threshold, or
a certain number of frames, from the additional image frames, have been acquired.

6. The image processing method of claim 1,
wherein generating one or more combined images includes generating a first combined image by:
extracting brightness and/or color information from the well-exposed image frame; and
using the brightness and/or color information from the well-exposed image frame to enhance the second image frame.

7. The image processing method of claim 1,
wherein generating one or more combined images includes generating a second combined image by:
extracting brightness and/or color information from the first combined image; and
using the brightness and/or color information from the first combined image to enhance the third image frame.

8. The image processing method of claim 1,
wherein an exposure time for capturing the additional image frames is determined using an implementation of an auto-exposure algorithm executed when a camera is set in a video mode.

9. The image processing method of claim 8,
wherein the camera is configured to acquire the first well-exposed image frame using an auto-exposure set for a time period that is larger than one imposed by a maximum frame rate.

10. An image acquisition and processing device, comprising:
an image acquisition unit configured to:
acquiring a first well-exposed image frame of a scene;
acquiring additional image frames of the same scene;
wherein the additional image frames include a second image frame and a third image frame;
an image combining unit configured to:
generating one or more combined images based on the well-exposed image frame of the scene and at least one of the additional image frames;
determining a frame-to-frame motion between the second image frame and the third image frame; and
responsive to said frame-to-frame motion exceeding a threshold, acquiring a second well-exposed image frame of the scene.

11. The image acquisition and processing device of claim 10, wherein the image combining unit is further configured to:
after acquiring the second well-exposed image frame, acquiring second additional image frames of the scene;
generating one or more combined images based on the second well-exposed image frame and at least one of the second additional image frames; and
acquiring a third well-exposed image frame responsive to the number of second additional image frames exceeding a threshold.

12. The image acquisition and processing device of claim 10,
wherein the frame-to-frame motion is determined from a registration of the additional image frames.

13. The image acquisition and processing device of claim 10,
wherein the additional image frames are frames that are exposed using an exposure determined from a maximum frame-rate.

14. The image acquisition and processing device of claim 10,
wherein the one or more combined images are generated based on the well-exposed image frame of the scene and the additional image frames of the same scene until one or more conditions are satisfied, wherein the one or more conditions include:
the frame-to-frame motion between two particular additional image frames, from the additional image frames, exceeds the threshold, or
a certain number of frames, from the additional image frames, has been recorded.

15. The image acquisition and processing device of claim 10,
wherein the one or more combined images are generated by extracting brightness and/or color information from the well-exposed image frame to enhance the at least one of the additional image frames.

16. The image acquisition and processing device of claim 10,
wherein an exposure time for capturing the additional image frames is determined using an implementation of an auto-exposure algorithm executed when a camera is set in a video mode.

17. The image acquisition and processing device of claim 16,
wherein the camera is configured to acquire the first well-exposed image frame using an auto-exposure set for a time period that is larger than one imposed by a maximum frame rate.

18. A non-transitory computer readable storage medium storing one or more instructions which, when executed by a processor, cause the processor to perform:
acquiring a first well-exposed image frame of a scene;
acquiring additional image frames of the same scene;
wherein the additional image frames include a second image frame and a third image frame;
generating one or more combined images based on the well-exposed image frame of the scene and at least one of the additional image frames;
determining a frame-to-frame motion between the second image frame and the third image frame; and
responsive to said frame-to-frame motion exceeding a threshold, acquiring a second well-exposed image frame of the scene.

19. The non-transitory computer readable storage medium of claim 18,
wherein the instructions include instructions for:
after acquiring the second well-exposed image frame, acquiring second additional image frames of the scene;

generating one or more combined images based on the second well-exposed image frame and at least one of the second additional image frames; and acquiring a third well-exposed image frame responsive to the number of second additional image frames exceeding a threshold.

20. The non-transitory computer readable storage medium of claim 18, wherein the frame-to-frame motion is determined from a registration of the additional image frames.

21. The non-transitory computer readable storage medium of claim 18, wherein the additional image frames are frames that are exposed using an exposure determined from a maximum frame-rate.

22. The non-transitory computer readable storage medium of claim 18, wherein the one or more combined images are generated based on the well-exposed image frame of the scene and the additional image frames of the same scene until one or more conditions are satisfied:

the frame-to-frame motion between two particular additional image frames, from the additional image frames, exceeds the threshold, or a certain number of frames, from the additional image frames, has been recorded.

23. The non-transitory computer readable storage medium of claim 18, wherein the one or more combined images are generated by extracting brightness and/or color information from the well-exposed image frame to enhance the at least one of the additional image frames.

24. The non-transitory computer readable storage medium of claim 18, wherein an exposure time for capturing the additional image frames is determined using an implementation of an auto-exposure algorithm executed when a camera is set in a video mode.

25. The non-transitory computer readable storage medium of claim 24, wherein the camera is configured to acquire the first well-exposed image frame using an auto-exposure set for a time period that is larger than one imposed by a maximum frame rate.

* * * * *